United States Patent [19]

Barthelemy

[11] Patent Number: 4,829,138
[45] Date of Patent: May 9, 1989

[54] NOVEL HEAT-STABLE SILOXANE/BISMALEIMIDO POLYMERS

[75] Inventor: Pascal Barthelemy, Lyons, France

[73] Assignee: Rhone-Poulenc Chimie, Courbevoie, France

[21] Appl. No.: 159,907

[22] Filed: Feb. 24, 1988

[30] Foreign Application Priority Data

Feb. 24, 1987 [FR] France ............................... 87 02616

[51] Int. Cl.$^4$ ............................................. C08F 22/40
[52] U.S. Cl. ................................... 526/262; 526/279; 528/32
[58] Field of Search .................... 526/262, 279; 528/32

[56] References Cited

U.S. PATENT DOCUMENTS 3,966,531 6/1976 Bargain ............................... 526/262

FOREIGN PATENT DOCUMENTS 2137644A 10/1984 United Kingdom .

OTHER PUBLICATIONS

Chemical Abstracts, 101: 112026y, "Preparation and Characterization of a Siloxane Containing Bismaleimide", published Oct. 1, 1984.

Primary Examiner—Melvyn I. Marquis
Attorney, Agent, or Firm—Burns, Doane, Swecker & Mathis

[57] ABSTRACT

Novel heat-stable imido polymers, well adapted for the production of a wide variety of useful shaped articles, comprise the copolymerizate of (a) at least one diorganopolysiloxylated N,N'-bismaleimide having the following general formula (I):

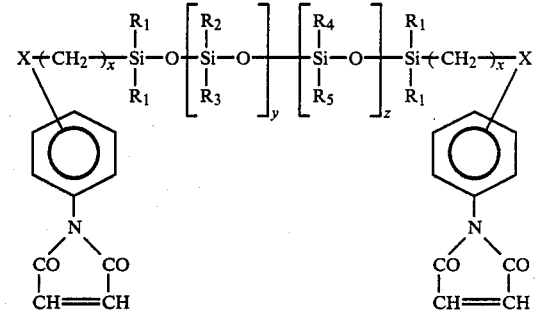

with (b) at least one other N,N'-bismaleimide comonomer, optionally, (c) at least one olefinically unsaturated comonomer copolymerizable with the bismaleimides (a) and (b), and, also optionally, (d) a catalyst.

14 Claims, No Drawings

NOVEL HEAT-STABLE SILOXANE/BISMALEIMIDO POLYMERS

CROSS-REFERENCE TO COMPANION APPLICATIONS

My copending applications, Ser. No. 159,911, and Ser. No. 159,906, both filed concurrently herewith and both assigned to the assignee hereof.

BACKGROUND OF THE INVENTION

1. Field of the Invention

The present invention relates to novel heat-stable polymers prepared from a bismaleimide reactant containing a diorganopolysiloxane linkage in its molecular structure, and also to various processes for the preparation of such polymers.

2. Description of the Prior Art

Already known to this art (cf. French Patent No. 1,455,514) are three-dimensional polyimides prepared by heating N,N'-bisimides of unsaturated carboxylic acids such as, for example, an N,N'-bismaleimide. These polymers, which exhibit a remarkable heat stability, may be employed for the manufacture of molded shaped articles well adapted for a wide variety of end application.

SUMMARY OF THE INVENTION

A major object of the present invention, thus, is the provision of novel polymers exhibiting, among other properties, a high impact strength, these novel polymers being prepared by reacting an N,N'-bismaleimide containing a diorganopolysiloxane linkage in its structure with one or more N,N'-bismaleimides of the type described in the aforementioned patent and, if desired, a copolymerizable comonomeric reactant.

Briefly, the present invention features polymers containing imide groups, comprising the copolymerizate, at a temperature ranging from 50° to 300° C., of:

(a) an N,N'-bismaleimide containing a diorganopolysiloxane linkage corresponding essentially to the following general formula:

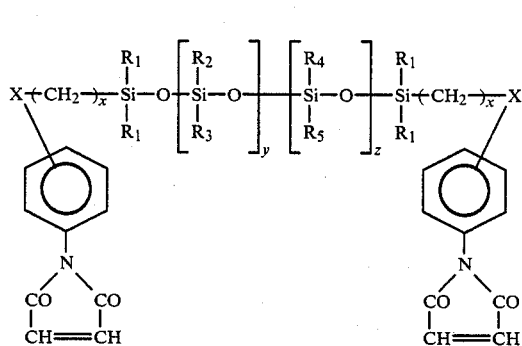

(I)

in which:

X, which is in the ortho, meta or para position relative to the nitrogen-bonded carbon atom of the benzene ring, denotes one of the following atoms or groups:

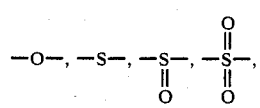

$R_1$, $R_2$, $R_3$, $R_4$ and $R_5$, which are identical or different, each denote a monovalent hydrocarbon radical selected from among linear or branched chain alkyl radicals containing from 1 to 12 carbon atoms, or substituted such radicals bearing one or more chlorine, bromine or fluorine atom substituents or a —CN substituent; a phenyl radical optionally substituted by one or more alkyl and/or alkoxy radicals containing from 1 to 4 carbon atoms, or by one or more chlorine atoms;

the symbol x is an integer within the range of from 2 to 8;

the symbols y and z denote identical or different, whole or fractional numbers whose sum ranges from 0 to 100; with (b) at least one N,N'-bismaleimide having the formula:

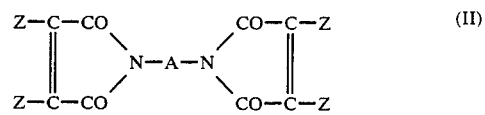

(II)

in which:

the symbols Z, which are identical or different, each denote H, $CH_3$ or Cl;

the symbol A denotes a divalent radical selected from among cyclohexylene, phenylene, 4-methyl-1,3-phenylene, 2-methyl-1,3-phenylene and 5-methyl-1,3-phenylene and 2,5-diethyl-3-methyl-1,4-phenylene radicals, and the radicals of formula:

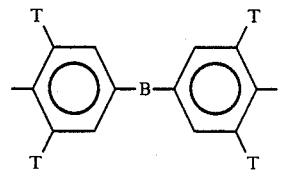

in which B denotes a single valence bond or one of the groups or atoms;

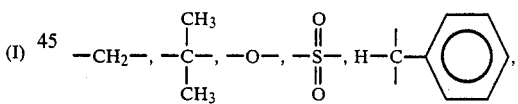

and the symbols T, which are identical or different, each denote a hydrogen atom or a methyl, ethyl or isopropyl radical;

(c) optionally, one or more comonomers other than a bismaleimide of formula (I) or of formula (II) and containing one or more polymerizable carbon-carbon double bonds; and (d) optionally, a catalyst.

DETAILED DESCRIPTION OF THE PREFERRED EMBODIMENTS OF THE INVENTION

More particularly according to the present invention, for a bismaleimide of the formula (I), when y and/or z are greater than 1, the subject compound is polymeric in structure and is rarely a single compound, but is most often a mixture of compounds having the same chemical structure, which differ in the number of recurring units in their molecule; this gives use to a mean value of y and/or z which may be integral or fractional.

When the preparation of the polymers according to the invention is carried out according to the description which follows, in an organic diluent or solvent, any one of the compounds of formula (I) may be employed. Among the preferred bismaleimides according to the present invention, exemplary are those which correspond to the formula (I) in which:

(1) $X=-O-$; $R_1$, $R_2$, $R_3$, $R_4$ and $R_5$, which are identical or different, each denote a linear or branched chain alkyl radical containing from 1 to 6 carbon atoms; $x=2$, 3, 4 or 5; $y+z$ ranges from 0 to 100, and preferably from 4 to 70;

(2) $X=-O-$; $R_1$, $R_2$ and $R_3$, which are identical or different, each denote a linear or branched chain alkyl radical containing from 1 to 6 carbon atoms; $R_4$ and $R_5$ each denote a phenyl radical; $x=2$, 3, 4 or 5; $y+z$ ranges from 0 to 100, and preferably from 4 to 70;

(3) $X=-O-$; $R_1$, $R_2$ and $R_4$, which are identical or different, each denote a linear or branched chain alkyl radical containing from 1 to 6 carbon atoms; $R_3$ and $R_5$ each denote a phenyl radical; $x=2$, 3, 4 or 5; $y+z$ ranges from 0 to 100, and preferably from 4 to 70;

(4) $X=-O-$; $R_1$ denotes a linear or branched chain alkyl radical containing from 1 to 6 carbon atoms; $R_2$, $R_3$, $R_4$ and $R_5$ each denote a phenyl radical; $x=2$, 3, 4 or 5; $y+z$ ranges from 0 to 100, and preferably from 4 to 70.

More preferred are those which correspond to the formula (I) in which:

(5) $X=-O-$; $R_1=R_2=R_3=R_4=R_5=$linear alkyl radical containing from 1 to 3 carbon atoms; $x=2$, 3 or 4; $y+z$ ranges from 0 to 100, and preferably from 4 to 70;

(6) $X=-O-$; $R_1=R_2=R_3=$linear alkyl radical containing from 1 to 3 carbon atoms; $R_4=R_5$ phenyl radical; $x=2$, 3 or 4; $y+z$ ranges from 0 to 100, and preferably from 4 to 70;

(7) $X=-O-$; $R_1=R_2=R_4=$linear alkyl radical containing from 1 to 3 carbon atoms; $R_3=R_5$ a phenyl radical; $x=2$, 3 or 4; $y+z$ ranges from 0 to 100, and preferably from 4 to 70;

(8) $X=-O-$; $R_1=$linear alkyl radical containing from 1 to 3 carbon atoms; $R_2=R_3=R_4=R_5=$phenyl radical; $x=2$, 3 or 4; $y+z$ ranges from 0 to 100, and preferably from 4 to 70.

Most preferred bismaleimides are those which correspond to formula (I) in which:

(9) $X=-O-$; $R_1=R_2=R_3=R_4=R_5=$methyl radical; $x=3$; $y+z$ ranges from 0 to 100, and preferably from 4 to 70;

(10) $X=-O-$; $R_1=R_2=R_3=$methyl radical; $R_4=R_5=$phenyl radical; $x=3$; $y+z$ ranges from 0 to 100, and preferably from 4 to 70;

(11) $X=-O-$; $R_1=R_2=R_4=$methyl radical; $R_3=R_5$ phenyl radical; $x=3$; $y+z$ ranges from 0 to 100, and preferably from 4 to 70;

(12) $X=-O-$; $R_1=$methyl radical; $R_2=R_3=R_4=R_5=$phenyl radical; $x=3$; $y+z$ ranges from 0 to 100, and preferably from 4 to 70.

As specific examples of bismaleimides which are most especially representative, the following are particularly representative:

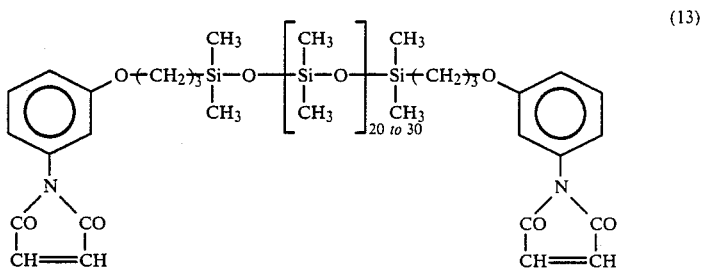

(13)

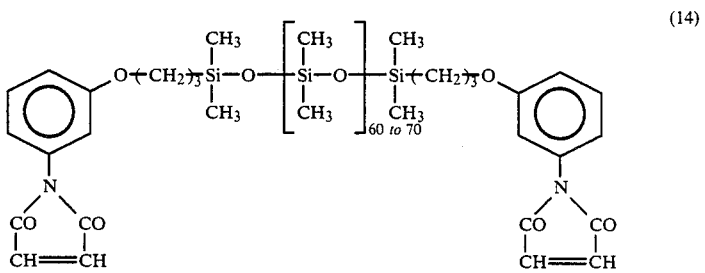

(14)

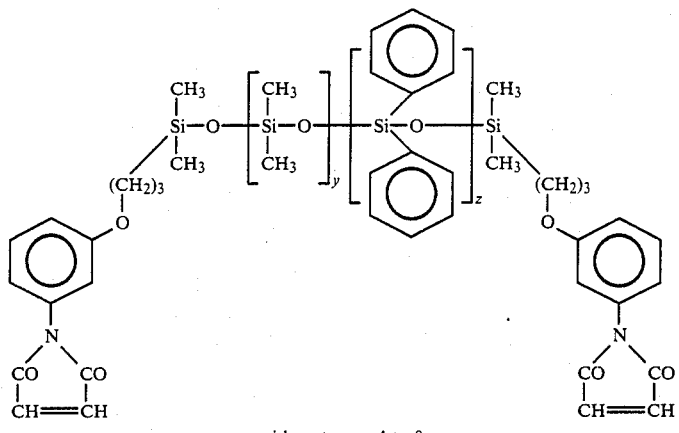

with y + z = 4 to 8

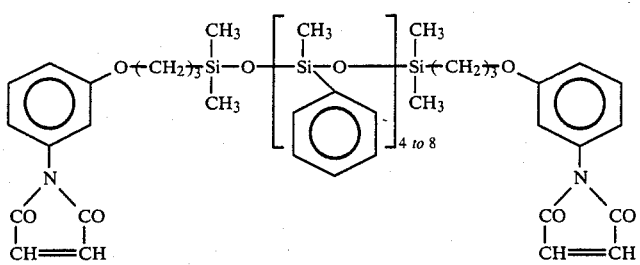

When the preparation of the polymers according to the invention is carried out in bulk, the bismaleimides of formula (I) which are preferably employed are those in which the diorganopolysiloxane group contains a plurality of Si-phenyl or Si-substituted phenyl bonds. Bismaleimides of this type which are suitable are those belonging to the following groups, classified in an increasing order of preference:
(i) bismaleimides no. 2, 3 and 4;
(ii) bismaleimides no. 6, 7 and 8;
(iii) bismaleimides no. 10, 11 and 12.

Among the bismaleimides belonging to these preferred groups, those which are very particularly suitable for preparing polymers in bulk are the compounds in which the ratio:

number of Si—(optionally substituted) phenyl bonds / number of Si—alkyl bonds is at least equal to 0.25; by way of specific examples of bismaleimides of this type, particularly representative are the compounds no. 16.

The bismaleimides of formula (I) are prepared by reacting maleic anhydride, in the presence of a dehydrating agent, a tertiary amine, an organic diluent and a catalyst, with a diamine containing a diorganopolysiloxane linkage and having the formula:

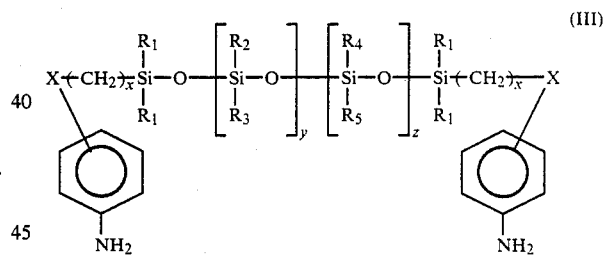

in which X, $R_1$, $R_2$, $R_3$, $R_4$, $R_5$, x, y and z are as defined above.

These diamines (III) containing a diorganopolysiloxane group are compounds which are well known to this art. They are described, for example, in British Patent No. 1,062,418 and in U.S. Pat. No. 4,395,527.

According to these patents, a first method for the preparation of these diamines, which is especially applicable to prepare a compound of formula (III) where $y=z=0$, that is to say, when a diamine is prepared containing a diorganodisiloxane group, by reacting a compound of the formula

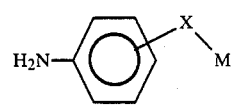

wherein X is as defined above and M is an alkali or alkaline earth metal, with a bis(haloalkyl)disiloxane of the formula:

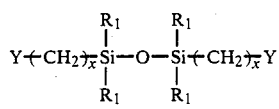

wherein x is as defined above and Y is a chlorine, bromine or iodine atom, at a temperature of from 20° to 200° C., in the presence of an aprotic polar solvent.

In the case where it is desired to prepare a diamine of formula (III) in which y and/or z are other than zero, a second described method includes copolymerizing one mole of diamine containing a diorganodisiloxane group, prepared as indicated above, with a quantity of one or more cyclic diorganopolysiloxanes adapted to provide y moles of siloxy groups of the formula:

and/or z moles of siloxy groups of the formula:

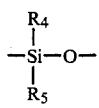

In general, the reaction takes place at a temperature of from 80° to 250° C. in the presence, again, of a solvent and, optionally, of a suitable catalyst.

Another process for preparing the diamines of formula (III), where y and/or z are equal to zero or other than zero, comprises reacting an ethylenically unsaturated compound of the formula:

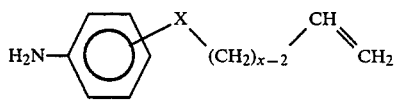

in which X, which is in the ortho, meta or para position relative to the nitrogen-bonded carbon atom of the benzene ring, and x are as defined above, with an alpha, omega-bis(hydrogeno)diorganopolysiloxane of the formula:

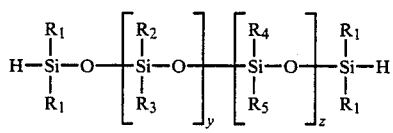

in which $R_1$, $R_2$, $R_3$, $R_4$, $R_5$, y and z are as defined above. This hydrosilylation reaction is carried out in bulk, in the absence of solvent, and employing a platinum-based catalyst. The alpha, omega-bis(hydrogeno)-diorganopolysiloxanes employed are well known polymers in the silicone art and are, in some cases, available commercially. They are described, for example, in French Patent Nos. 2,486,952 and 2,058,988.

When it is decided to use this hydrosilylation reaction to prepare a diamine of formula (III), the ethylenically unsaturated amine substrate which is well adapted to react with the alpha, omega-bis(hydrogeno)diorganopolysiloxane is, in particular, an allyloxyaniline of the formula:

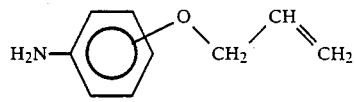

These especially favorable conditions, therefore, are employed to prepare diamines of formula (III) which will be used to produce some of the bismaleimides of formula (I), namely, those in which $X = -O-$, $x = 3$ and $R_1$, $R_2$, $R_3$, $R_4$, $R_5$, y and z are as defined above.

Again considering the process for the preparation of the bismaleimides of formula (I), the diamine of formula (III) is reacted, as indicated above, with maleic anhydride in the presence of a dehydrating agent, a tertiary amine, an organic diluent and a catalyst.

The maleic anhydride is employed in quantities which are at least equal to one mole per available $NH_2$ functional group; generally, larger quantities are employed, which are on the order of 1.01 to 1.5 moles per available $NH_2$ functional group.

The dehydrating agent is advantageously a lower carboxylic acid anhydride such as acetic anhydride in a quantity at least equal to one mole per available $NH_2$ functional group present in the molecule of the diamine of formula (III). Generally, larger quantities are employed, which are on the order of 1.05 to 1.5 moles per available $NH_2$ functional group.

Among the tertiary amines which are suitable, the trialkylamines and N,N-dialkylanilines, in which the alkyl radicals contain from 1 to 12 carbon atoms, are especially representative. Triethylamine and N,N-dimethylaniline are preferred. The quantities of tertiary amines generally range from 0.05 to 0.8 moles per available $NH_2$ functional group.

The reaction is carried out in an organic diluent which is liquid under the operating conditions, in practice from 20 to 100 at atmospheric pressure. Among the solvents which may be employed, preferred are those which dissolve the starting maleic anhydride under the temperature conditions selected for the reaction and in the presence of the other constituents of the reaction mixture.

Among these, the following are particularly representative:

(i) hydrocarbons such as benzene, toluene and cyclohexane;

(ii) chlorinated compounds such as chlorobenzene or methylene chloride;

(iii) cyclic or noncyclic ethers such as tetrahydrofuran, dioxane or ethyl ether;

(iv) dialkyl ketones such as acetone or methyl ethyl ketone.

The catalysts which may be employed include a nickel compound which is soluble in the liquid phase of the reaction mixture such as, for example, nickel salts of carboxylic acids, optionally hydrated, as well as the chelated forms of this metal. The acetate and the acetylacetonate are particularly suitable. These catalysts are employed in very small quantities, on the order of $0.5 \times 10^{-3}$ to $5 \times 10^{-3}$ moles per mole of available $NH_2$ functional group.

In practice, for carrying out the process, maleic anhydride and the diamine of formula (III) are first reacted, in the selected diluent at a temperature ranging from 30° to 100° C. for a period of time ranging from a few minutes to 1 hour, depending on the temperature. The dehydrating agent, the tertiary amine and, lastly, the catalyst are then added to the reaction mixture, and the mixture is then permitted to react under the temperature conditions previously adopted for a period of time ranging from 1 hour to 3 hours, depending on the temperature. The reaction is generally terminated by adding a nonsolvent, such as water, and then the bismaleimide of formula (I) which has been prepared is isolated according to the usual methods.

By way of specific examples of the bismaleimides of formula (II), particularly representative are:
(i) N,N'-meta-phenylenebismaleimide;
(ii) N,N'-para-phenylenebismaleimide;
(iii) N,N'-4,4'-diphenylmethanebismaleimide;
(iv) N,N'-4,4'-diphenyl ether bismaleimide;
(v) N,N'-4,4'-diphenylsulfonebismaleimide;
(vi) N,N'-1,4-cyclohexylenebismaleimide;
(vii) N,N'-4,4'-(1,1-diphenylcyclohexane)bismaleimide;
(viii) N,N'-4,4'-(2,2-diphenylpropane)bismaleimide;
(ix) N,N'-4,4'-triphenylmethanebismaleimide;
(x) N,N'-2-methyl-1,3-phenylenebismaleimide;
(xi) N,N'-4-methyl-1,3-phenylenebismaleimide; and
(xii) N,N'-5-methyl-1,3-phenylenebismaleimide.

These bismaleimides may be prepared according to the procedures described in U.S. Pat. No. 3,018,290 and British Patent No. 1,137,290. N,N'-4,4'-diphenylmethanebismaleimide, either alone or mixed with N,N'-2-methyl-1,3-phenylenebismaleimide, N,N'-4-methyl-1,3-phenylenebismaleimide and/or N,N'-5-methyl-1,3-phenylenebismaleimide, is preferably used to carry out the present invention.

In comparison with the polyimides obtained according to French Patent No. 1,455,514 by heating, particularly of N,N'-4,4'-diphenylmethanebismaleimide, it has been found that the addition of an N,N'-bismaleimide containing a diorganopolysiloxane linkage of formula (I) to the polymerization medium is a measure which, when these polymers are prepared in bulk, makes it possible, in particular, to facilitate the transition of the maleimides into the molten state and to markedly improve the mechanical properties, increasing at least 2-fold the resilience values of the cured polymers.

In certain cases it may be advantageous to modify the polymers according to the invention by including a copolymerizable comonomeric reactant (c). As such an optional reactant (c) which is suitable, exemplary are:
(1) when it is desired, for example, to reduce the fluidity of the polymerization medium;
(c₁) either one or more monomers of the formula:

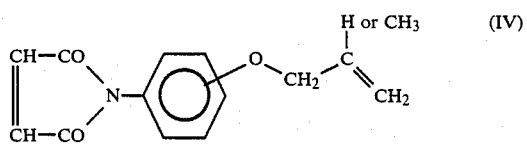

in which the allyloxy or methallyloxy radical is in the ortho, meta or para position relative to the nitrogen-bonded carbon atom of the benzene ring; or (c₂) a composition comprising:
(2) a mixture of a monomer of the formula:

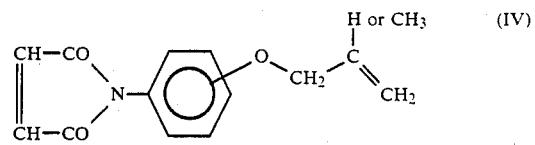

in which the allyloxy or methallyloxy radical is in the ortho, meta or para position relative to the nitrogen-bonded carbon atom of the benzene ring, with at least one monosubstituted derivative of the formula:

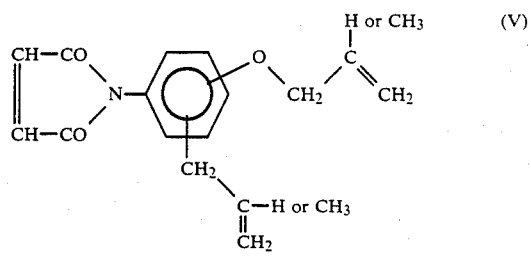

and, if desired, one or more disubstituted derivatives of the formula:

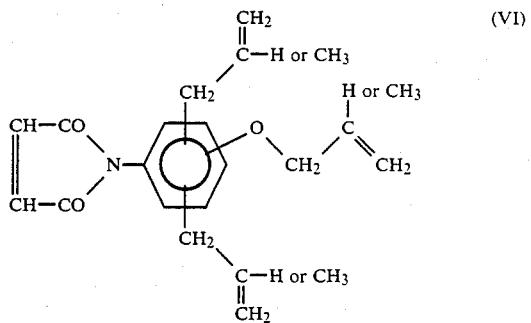

In the above-mentioned composition used as reactant (c₂), the proportions of the various constituents of the mixture of the compounds of formulae (IV), (V) and, if desired, (VI) may vary over wide limits. In general, the proportions of the constituents are selected within the following limits (expressing the weight percentage of each of the constituents in the mixture):

(i) at least 30%, and preferably from 50% to 80% of N-(meth)allyloxyphenylmaleimide of the formula (IV);

(ii) from 5% to 50% and preferably from 10% to 35% of mono(meth)allyl substituted derivative(s) of the formula (V); and (iii) from 0% to 20% and preferably from 0% to 15% of the di(meth)allyl substituted derivative(s) of the formula (VI), with the proviso that the sum of the constituents is equal to 100% by weight in each case.

When it is desired, for example, to further improve the hot flexural properties, the following may be included:

(c₃) one or more substituted heterocycles containing one or more carbon-carbon double bonds.

It should be appreciated that mixtures of the reactants (c₁)+(c₃) or (c₂)+(c₃) may be employed as the reactant (c).

Regarding the optional reactant (c₁), exemplary are:
N-(2-allyloxyphenyl)maleimide;
N-(3-allyloxyphenyl)maleimide;
N-(4-allyloxyphenyl)maleimide;

N-(2-methallyloxyphenyl)maleimide;
N-(3-methallyloxyphenyl)maleimide;
N-(4-methallyloxyphenyl)maleimide; and mixtures thereof.

The maleimides of formula (IV) are known compounds which are described in European Patent Application No. EP-A1-0,208,634.

Regarding the optional reactant ($c_2$), the crude product obtained by carrying out the process described hereinafter is preferably employed as a compound comprising a mixture of N-(meth)allyloxyphenylmaleimide of formula (IV) with one or more (meth)allyl substituted derivatives of formula(e) (V) and, if desired, (VI).

This process is characterized in that it includes the following 3 stages which are carried out consecutively in the same reactor:

(a) the first stage includes reacting an aminophenol with maleic anhydride in solvent medium at a temperature ranging from 20° C. to 200° C., for a period of time ranging, depending on the temperature selected, from 30 minutes to 2 hours and it provides a first reaction mixture comprising an N-(hydroxyphenyl)maleamic acid;

(b) the second stage includes conducting a (meth)allylation reaction of the aforementioned acid, by reacting the first reaction mixture with a (meth)allyl halide at a pH which must be adjusted to and maintained at a constant value of from 7 to 14 by addition of a determined amount of an alkaline aqueous solution and at a temperature ranging from 40° C. to 150° C. and, after acidification and removal of the aqueous phase, it provides a second organic reaction mixture comprising an N-[(meth)allyloxyphenyl]maleamic acid, one or more N-[(meth)allyloxy,(meth)allylphenyl]maleic acids and, if desired, one or more N-[(meth)allyloxy,di(meth)allylphenyl]maleamic acids;

(c) the third stage includes ring closure of the aforementioned maleamic acids by reacting the second reaction mixture with an anhydride of a lower carboxylic acid, in the presence of a tertiary amine and, if desired, of a catalyst, and in then removing the reaction solvent. It provides crude reaction product comprising a mixture of: at least 30% by weight and preferably from 50% to 80% of N-(meth)allyloxyphenylmaleimide; from 5 to 50% by weight and preferably from 10% to 35% by weight of one or more N-[(meth)allyloxy, (meth)allylphenyl]maleimides; and from 0% to 20% by weight and preferably from 0 to 15% by weight of one or more N-[(meth)allyloxy, di(meth)allylphenyl]maleimides.

The 3 stages described above are linked consecutively in a single solvent for greater process simplicity, but it is possible to effect a solvent change, during one stage or another, without inconvenience. The choice of the solvent may be very wide, but, since the second stage is carried out in a hydroorganic two-phase medium, it may be desirable to employ a water-immiscible organic solvent, which considerably simplifies the treatment of the reaction medium.

Among the water-miscible or immiscible solvents which may thus be used, preferred are those which dissolve the starting aminophenol, under the temperature conditions selected for the synthesis. Among these solvents, representative are, for example: alcohols (such as, for example: methanol, ethanol, butanol), ketones (such as, for example: acetone, methyl ethyl ketone, methyl isobutyl ketone), nitriles (such as, for example: benzonitrile, propionitrile, acetonitrile), esters (such as, for example: ethyl or butyl acetate), aromatic solvents (such as, for example: anisole, chlorobenzene), and halogenated hydrocarbons (such as, for example: chloroform, dichloromethane, dichloroethane).

Regarding the first stage of the process, it may be said that the concentration of the starting reactants in the solvent employed is not critical. Nonetheless, there is no advantage in excessive dilution for reasons of production efficiency nor for excessive concentration in order to have good stirrability. In this first stage, maleic anhydride is employed in quantities which are at least equal to one mole per mole of aminophenol; generally, larger quantities are employed, which are on the order of 1.01 to 1.5 moles per mole of aminophenol. Furthermore, the temperature preferably ranges from 40° C. to 60° C.

Regarding the second step, this is initiated by adding to the reaction mixture the quantity of an alkaline aqueous solution, for example of an aqueous NaOH solution, which is necessary, on the one hand, to form a salt of N-(hydroxyphenyl)maleamic acid and, on the other hand, to obtain the desired pH. The pH should be maintained constant throughout the reaction by the addition of sodium hydroxide. Preferably, the pH is adjusted and maintained at a constant value of from 10 to 12. The allylation reaction is preferably carried out using (meth)allyl bromide or chloride. The quantity of (meth)allyl halide is on the order of 1.5 to 10 moles per phenolic OH molar group and, preferably, on the order of 2 to 4. The excess of the reactant may be recovered at the end of the run and recycled into a subsequent run. The time required to introduce the (meth)allyl halide is not critical and may range from 1 hour to 5 hours and, preferably, from 2 hours to 4 hours. In this second stage, the temperature preferably ranges from 60° C. to 100° C. It should be noted that at the end of this stage, the aqueous phase is acidified to a pH approximately equal to 1 using the usual acids, preferably inorganic oxyacids or hydracids. The aqueous layer is removed and the organic layer is retained in the reactor.

Regarding the third stage of the process, acetic anhydride is advantageously employed as an anhydride of a lower carboxylic acid, in quantities at least equal to one mole per HOOC—CH=CH—CO—NH molar group to be cyclized. Generally, larger quantities are employed, which are on the order of 1.05 to 1.5 moles per maleamic group.

Among suitable tertiary amines, trialkylamines and N,N-dialkylanilines in which the alkyl radicals contain from 1 to 12 carbon atoms are particularly representative. Triethylamine and N,N-dimethylaniline are preferred. The quantities of tertiary amine range from 0.05 to 2 moles per HOOC—CH=CH—CONH— molar group.

The catalysts which may be used are, for example, nickel salts of carboxylic acids, optionally hydrated, as well as the chelated forms of this metal. The acetate and the acetylacetonate are particularly suitable. These catalysts are employed in very small quantities, on the order of 0.05 to 1.5 g per HOOC—CH=CH—CO—NH— molar group and, preferably, on the order of 0.1 to 0.8 g.

The temperature in the third stage is not critical and affects only the reaction kinetics. This temperature may, for example, range from 40° C. to 150° C. and, preferably, from 60° C. to 80° C. At the end of this stage, the solvent is removed by vacuum distillation and the crude reaction product, which has the appearance of an oil, is obtained.

In a preferred embodiment of the invention, the above-mentioned process is well suited, beginning with metaaminophenol, for the preparation of compositions comprising mixtures based on: N-[3-(meth)allyloxyphenyl]maleimide + N-[3-(meth)allyloxy-4-(meth)allylphenyl]maleimide + N-[3-(meth)allyloxy-6-(meth)allylphenyl]maleimide + if desired N-[3-(meth)allyloxy-4,6-di(meth)allylphenyl]maleimide.

It will be appreciated that beginning with orthoaminophenol provides compositions comprising mixtures based on: N-[2-(meth)allyloxyphenyl]maleimide + N-[2-(meth)allyloxy-3-(meth)allylphenyl]maleimide + N-[2-(meth)allyloxy-5-(meth)allylphenyl]maleimide + if desired N-[2-(meth)allyloxy-3,5-di(meth)allylphenyl]maleimide. It will also be appreciated that beginning with para-aminophenol provides compositions comprising mixtures based on: N-[4-(meth)allyloxyphenyl]maleimide + N-[4-(meth)allyloxy-3-(meth)allylphenyl]maleimide + if desired N-[4-(meth)allyloxy-3,5-di(meth)allylphenyl]maleimide.

Regarding the optional reactant ($c_3$), this is advantageously selected from among: vinylpyridines, N-vinylpyrrolidone, allyl isocyanurate, triallyl- isocyanurate and vinyltetrahydrofuran.

the reactivity of the constituents (a), (b) and, if desired, (c) of the polymerization mixture according to the invention may be increased, for example when the intended applications require mechanical injection molding operations to be carried out, by the addition of a catalyst (d) which may be either ($d_1$) a radical polymerization initiator such as, for example, dicumyl peroxide, lauroyl peroxide or azobisisobutyronitrile, or ($d_2$) an imidazole compound.

The said imidazole compound ($d_2$) corresponds to the general formula:

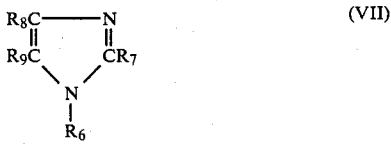

(VII)

in which $R_6$, $R_7$, $R_8$ and $R_9$, which are identical or different, each denote a hydrogen atom, an alkyl or alkoxy radical containing from 1 to 20 carbon atoms or a vinyl, phenyl or nitro radical, with the proviso that $R_8$ and $R_9$, with the carbon atoms from which they depend, may together form a single ring, such as, for example, a benzene ring, and with the further proviso that $R_6$ may also denote a carbonyl group linked to a second imidazole ring.

As specific examples of imidazole compounds ($d_2$), representative are, in particular: imidazole or glyoxaline, 1-methylimidazole, 2-vinylimidazole, 1,2-dimethylimidazole, 1-vinylimidazole, 1-vinyl-2-methylimidazole, benzimidazole and carbonyldiimidazole.

In the heat-stable polymers described above, the quantities of reactants (a) and (b) are selected such as to provide, by weight relative to the total weight of the constituents:

(i) from 2 to 50%, and preferably from 5 to 20%, of bismaleimide of formula (I);

(ii) from 50 to 98%, and preferably from 80 to 95%, of bismaleimide(s) of formula (II).

Regarding the quantity of the optional reactant (c), this generally represents less than 60%, and preferably from 5% to 50%, of the total weight of the reactants (a)+(b).

Regarding the catalyst (d), depending on its nature and according to the desired polymerization rate in the application stage, this is employed in a proportion in the range of from 0.01 to 1% by weight relative to the total amount of the reactants (a)+(b)+optionally (c) and, preferably, ranging from 0.05 to 0.5%.

The polymers according to the invention may be prepared by direct heating of the reactant (a), of the reactant (b) and, optionally, of the reactant (c) with, if need be, the catalyst (d), at least until a homogeneous liquid mixture is obtained. The temperature may vary as a function of the physical state of the compounds present, but it generally ranges from 50° C. to 300° C. It is advantageous to intimately admix the starting compounds, and to maintain such intimately mixed state, before and during heating, for example by means of efficient stirring. When the compound (d) is employed, it is preferably added at the outset to the well-stirred reaction mixture containing the reactants (a) and/or (b). When this compound is particularly active, in order to avoid its encapsulation in the polymer network produced, it is desirable to add it in a solvent or diluent which is compatible with the reaction mixture; it has been found that it may be advantageous to employ one of the polar organic liquids which are discussed hereinafter, as a solvent or diluent.

The preparation of the polymers according to the invention may also be carried out by heating the mixture of the reactants in an organic diluent which is liquid over at least a part of the range 50° C. to 250° C. Among these diluents, especially representative are aromatic hydrocarbons such as xylenes and toluene, halogenated hydrocarbons such as chlorobenzenes, polar solvents such as dioxane, tetrahydrofuran and dibutyl ether, dimethylformamide, dimethyl sulfoxide, N-methylpyrrolidone, dimethylacetamide, methylglycol and ethyl ketone. The polymer solutions or suspensions may be employed as such for many end applications. The polymers may also be isolated, for example by filtration, if desired after precipitation by means of an organic diluent which is miscible with the solvent employed. In this context, a hydrocarbon whose boiling point does not markedly exceed 120° C. may be advantageously employed.

It will also be appreciated that the properties of the polymers according to the invention can vary to a large extent, particularly as a function of the precise nature of the reactants employed, of the proportions of reactants selected and of the precise temperature conditions within the above-mentioned range. Insofar as the final product polymers are concerned, the latter may be cured polymers, insoluble in the usual solvents, such as, for example, the compounds mentioned in the preceding paragraph and exhibiting no appreciable softening below the temperature at which they begin to degrade.

However, these polymers may also be prepolymers (P) soluble in polar organic solvents and exhibiting a softening point at a temperature below 200° C. (in general, this softening point ranges from 50° to 150° C.). These prepolymers may be produced in bulk by heating the mixture of the reactants until a homogeneous or pasty product is obtained at a temperature which generally ranges from 50° C. to 180° C. for a period of time which may range from a few minutes to a few hours, this time period being proportionally shorter the higher the temperature selected. Before the mixture of the reactants is subjected to heating, it is advantageous, again, to ensure that it is first intimately admixed by stirring. Here again there is a preferred method of employing the compound (d) and it is that indicated above in connection with the direct preparation of cured polymers. The preparation of the prepolymers may also be carried out in suspension or in solution in a diluent which is liquid over at least a part of the range 50°-180° C.

In the case where the optional reactant (c) is used, it should be noted that these prepolymers (P) may also be obtained by forming, from the reactant (a) and the reactant (c), a prepolymer (PP) which is then reacted with the reactant (b) and, if need be, the compound (d). A prepolymer (P'P') may also be prepared beforehand by heating the mixture of reactant (b), of reactant (c) and, if need be, of reactant (d), and then reacting it with the reactant (a) in order to obtain the prepolymer (P). The temperature and time conditions which are employed for the preparation of the prepolymers (PP) or (P'P') and for their conversion into prepolymers (P) are those indicated above in connection with the preparation of the prepolymers (P) by direct mixing of the reactants (a), (b) and, optionally, (c) with, if need be, the compound (d).

The prepolymers (P) may be employed in the form of a liquid mass, mere hot casting being sufficient in order to shape and to produce molded objects. They may also be employed, after cooling and milling, in the form of powders which are remarkably amenable to compression molding operations, if desired in the presence of fillers in powder, sphere, granule, fiber or flake form. The prepolymers (P) may be employed in the form of suspensions or of solutions for producing coatings and preimpregnated intermediate articles in which the reinforcement may consist of fibrous materials based on aluminum or zirconium silicate or oxide, carbon, graphite, boron, asbestos or glass. These prepolymers (P) may also be employed for the production of cellular materials after the incorporation of a blowing agent therein, such as, for example, azodicarbonamide.

In a second stage, the prepolymers (P) may be cured by heating them to temperatures on the order of 300° C., generally from 150° C. to 250° C.; an additional shaping may be carried out during the curing, if desired under vacuum or under superatmospheric pressure, it also being possible for these operations to be consecutive.

In the case where the optional reactant (c) is used, it is not a departure from the scope of the invention to prepare polymers which are not prepolymers (P), by using an intimate mixture of prepolymer (PP), of reactant (b) and, if need be, of compound (d) or of an intimate mixture of prepolymer (P'P') and of reactant (a) which are heated in bulk under the conditions described above.

The prepolymers according to the invention are of interest to those industrial sectors which require materials having good mechanical and electrical properties, as well as a high chemical inertness at temperatures of 200° C. to 300° C. By way of examples, they are suitable for the manufacture of plate or tubular insulators for electrical transformers, printed circuit boards, pinions, rings, and the like. The preimpregnated articles can be employed for the production of components of various shapes and functions in many industries such as, for example, in aeronautics. These components, known as laminates, which may be components of revolution, are obtained by stacking several layers of prepregs on a former or a support. The prepregs may also be employed as reinforcement or as means of repairing damaged components. It is also possible to produce shaped articles according to filament winding techniques with or without a support. Likewise as regards injection molding or pultrusion techniques. It too will be appreciated that, to produce molded shaped articles, it is possible to start either with the mixture of the reactants or with a prepolymer (P). When starting directly from the mixture of the reactants, this mixture is given the shape of the desired final object and curing is then carried out by heating. When starting with the prepolymer (P), this may be molded merely by hot casting or by injection and its cure then effected by heating.

In order to further illustrate the present invention and the advantages thereof, the following specific examples are given, it being understood that same are intended only as illustrative and in nowise limitative.

EXAMPLE 1

1. Description of a process for preparing the bismaleimide containing a diorganopolysiloxane linkage and having the following formula:

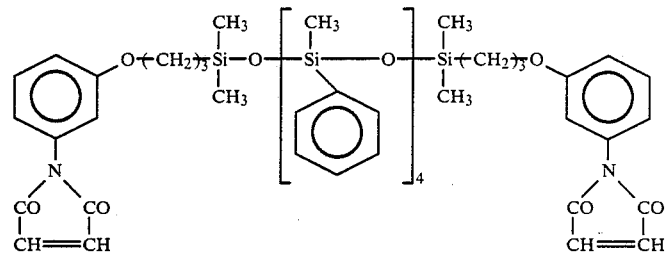

1.1 Preparation of a diamine containing a diorganopolysiloxane linkage from which the title bismaleimide is produced:

Into a glass reactor equipped with central stirring, a dropping funnel and a reflux condenser in which a slight overpressure of dry nitrogen was established, were charged 312 g (0.46 mole) of an alpha, omega-bis(-hydrogeno)diorganopolysiloxane of the formula:

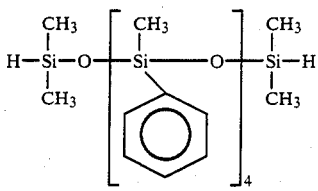

which had a molecular weight on the order of 678 g.

The reactor was then introduced into an oil bath preheated to 55° C., and the catalyst was then added thereto. The latter was the Karsted catalyst (a complex based on elemental platinum and 1,3-divinyl-1,1,3,3-tetramethyldisiloxane ligands). It was in solution in toluene (3.5% concentration by weight) and 1.49 cm³ of this catalyst solution were introduced with a syringe. The ratio r (weight of elemental platinum employed/weight of the reaction mass) was equal to $91 \times 10^{-6}$.

137 g (0.92 mole) of meta-allyloxyaniline were then gradually introduced into the reactor, ovr a period of 60 minutes, such as to control the exothermicity of the reaction (the temperature was maintained at 55° C.). Thirty minutes after completion of this addition, ambient temperature was restored.

The product obtained, 448.9 g in weight, was a clear viscous oil, orange-brown in color, which exhibited a proton NMR spectrum in agreement with the structure:

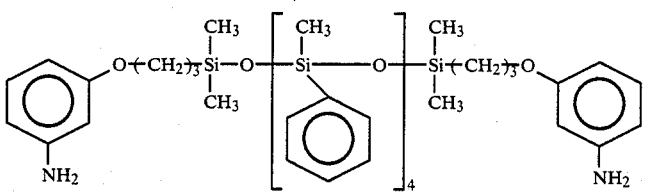

Its molecular weight was on the order of 976 g. Under these conditions, the degree of conversion of the reactants employed was 100% (neither amine, nor hydrogenated siloxane oligomer were detected by NMR and infrared analysis) and the weight yield of the desired diamine was 100%.

1.2 Preparation of the diorganopolysiloxanebismaleimide:

The following materials were introduced simultaneously, over 10 minutes, with the aid of 2 dropping funnels, into a glass reactor equipped with central stirring and with a reflux condenser in which a slight overpressure of dry nitrogen was established and which was placed in an oil bath preheated to 55° C.:

(i) 20 cm³ of an acetone solution of 25 g (0.025 mole and 0.05 NH₂ functional group) of the siloxane diamine prepared in paragraph 1.1.; and (ii) 15 cm³ of an acetone solution of 6.4 g (0.055 mole) of maleic anhydride.

When the additions had been completed, each dropping funnel was rinsed with 5 cm³ of acetone, which was then added to the reaction mass, maintained stirred for an additional 15 minutes.

6.1 g (0.06 mole) of acetic anhydride were charged into the dropping funnel which contained maleic anhydride, and 1.67 g (0.0165 mole) of triethylamine into the other funnel.

These two compounds were then introduced into the reactor and 0.3 cm³ of an aqueous solution containing 0.0528 mole of nickel acetate per 100 cm³ of solution was then added.

The reaction mixture was refluxed under stirring for 2 hours, 30 minutes. The temperature was then reduced to 20° C.

The reaction mixture was diluted with 80 cm³ of iced water (5° C.) under vigorous stirring and the oily product present was then extracted with 80 cm³ ethyl acetate. The resulting organic phase was washed with three 80 cm³ portions of water in order to attain a pH of 6 in the washes, and was then dried for 2 hours over anhydrous sodium sulfate. After filtration, ethyl acetate was removed by evaporation from the organic phase, this operation being completed under reduced pressure (approximately 70 Pa) at 60° C. and 27.3 g (i.e., a weight yield of 96% relative to theory) of a viscous, orange-brown product were collected, the NMR spectrum of which conformed to the structure of the desired bismaleimide set forth above. Its molecular weight was on the order of 1,136 g. In proton NMR (solvent: CDCl₆; reference: tetramethylsilane), the absence of the starting diamine was noted and the following chemical shifts, expressed in ppm, were noted:

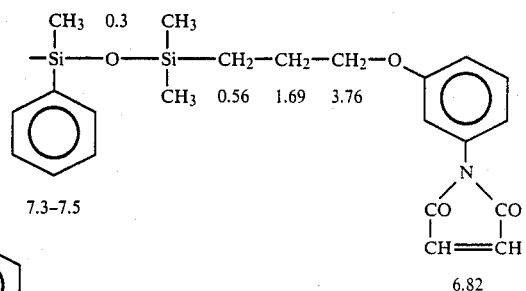

The ratio:

$$\frac{\text{number of Si-phenyl bonds}}{\text{number of Si-methyl bonds}}$$

was found to be equal to 0.5.

In infrared spectrometry, the presence of the following bands was noted: ν(imide C=O)=1710–1730 cm⁻¹; ν(maleimide C—N—C)=1160 cm⁻¹; ν(C—N—C)=1400 cm⁻¹.

2. Production of a heat-stable polymer in accordance with the present invention:

9.6 g of the bismaleimide containing a diorganopolysiloxane linkage which was described in Example 1 were introduced into a glass reactor equipped with a degassing side-arm and with an anchor-type stirrer and immersed in an oil bath preheated to 160° C. After 2 minutes of stirring, 70.4 g of N,N'-4,4'-diphenylmethanebismaleimide were then added over 8 minutes. The mixture was allowed to react while being stirred for 15 minutes, the last 5 of which were performed at a reduced pressure of 13.3×10² Pa.

The reaction mass, clear in appearance, was then cast into a mold preheated to 150° C. with the objective of preparing plaques 140×100×4 mm in size, which were subjected to the following cure cycle:

10 minutes at 160° C.;
130 minutes between 160° C. and 250° C.;
16 hours at 250° C.; and
2 hours between 250° C. and 25° C.

After demolding, the plaques based on cured, brown and translucent polymer were cut such as to produce specimens 60×10×4 mm in size, on which unnotched Charpy impact tests were carried out according to NFT Standard 51,035. The resilience at 25° C. obtained in this manner was 3.4 kj/m².

By way of a comparative test, the operations described above were reproduced by charging only 100 g of N,N'-4,4'-diphenylmethanebismaleimide into the reactor, preheated to 175° C. Reaction was allowed to take place under stirring for 12 minutes, 5 of which were carried out at a reduced pressure of 6.65×10² Pa.

The cure cycle for the plaques molded at 200° C. was the following:

1 hour 45 minutes at 200° C.;
1 hour between 200° C. and 250° C.;
16 hours at 250° C.; and
2 hours between 250° C. and 25° C.

The resilience at 25° C., measured on the specimens, was 1.7 kj/m².

EXAMPLE 2

Into a glass reactor equipped with an anchor-type stirrer and with a side-arm permitting the deposition of volatile products, were introduced, at ambient temperature:

(i) 18 g of N-(3-allyloxyphenyl)maleimide (0.0786 mole); and
(ii) 0.0907 g of imidazole.

The mixture was homogenized by stirring and 10.8 g of the bismaleimide containing a diorganopolysiloxane linkage (described above in Example 1) were added. The reactor was then immersed in an oil bath preheated to 160° C. After 2 minutes of stirring, 61.2 g of N,N'-4,4'-diphenylmethanebismaleimide (0.171 mole) were then added over 3 minutes to the stirred mixture. The reaction mass was then allowed to react for 6 minutes. The temperature was then lowered to 150° C. over 5 minutes and a reduced pressure of approximately 1.33×10² Pa was applied for 2 minutes, and then atmospheric pressure was restored, at which the reaction mass was stirred for an additional 3 minutes.

This mass was then cast in a mold preheated to 150° C. in order to prepare plaques 140×100×4 mm in size, which were subjected to the following cure cycle:

10 minutes between 150° C. and 250° C.;
16 hours at 250° C.; and
2 hours between 250° C. and 25° C.

After demolding, some of the plaques obtained based on cured, brown and opaque polymer were cut such as to obtain specimens 30×7×4 mm in size which were used for measuring the flexural strength (Sf) and modulus (Mf) (Instron apparatus with a distance of 25.4 mm between supports). The values of the flexural mechanical properties are reported in the following Table:

TABLE

| Sf in MPa | | | | Mf in MPa | | | |
|---|---|---|---|---|---|---|---|
| Initial | | after 1000 hours | | Initial | | after 1000 hours | |
| at 25° C. | at 250° C. | at 25° C. | at 250° C. | at 25° C. | at 250° C. | at 25° | at 250° C. |
| 140 | 81 | 115 | 55 | 2600 | 2100 | 2600 | 2200 |

Using DMA ("Dynamic Mechanical Analysis"), it was found that the flexural modulus was maintained very well at temperatures up to 350° C.

The remaining plaques obtained earlier were cut as to produce:

(a) specimens of the type described in Example 1, on which unnotched Charpy impact tests were carried out; the resilience at 25° C. was determined to be equal to 8.3 kj/m²;

(b) specimens known as C.T. ("Compact Tension") specimens according to the specifications of the ASTM Standard E 399 which were used for measuring the intrinsic mechanical parameters of the material, consisting of the concentration coefficient of critical stress in cracking mode 1 ($K_{1C}$) and of the rate of restoration of critical energy in cracking mode 1 ($G_{1C}$) (these parameters were used to evaluate the ability of the material to withstand crack propagation under the effect of an impact):

$$K_{1C} = 0.41 \pm 0.1 \text{ MPa } \nu m$$

$$G_{1C} = 60 \pm 5 \text{ J/m}^2.$$

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A heat-stable imido polymer prepared by polymerizing a reaction mixture comprising:

(a) a diorganopolysiloxylated N,N'-bismaleimide having the general formula (I):

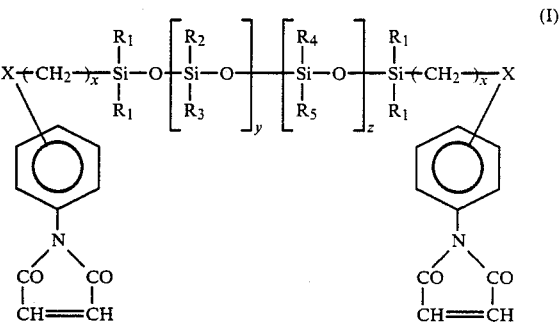

in which:

X, which is in the ortho, meta or para position relative to the nitorgen-bonded carbon atom of the benzene ring, is one of the following atoms or groups:

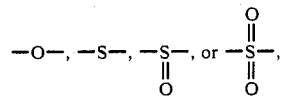

$R_1$, $R_2$, $R_3$, $R_4$ and $R_5$, which are identical or different, are each linear or branched chain alkyl radical containing from 1 to 12 carbon atoms, or a substituted such radical bearing one or more chlorine, bromine or fluorine atom substituents or a —CN substituent; or a phenyl radical optionally substituted by one or more alkyl and/or alkoxy radicals containing from 1 to 4 carbon atoms, or by one or more chlorine atoms;

the symbol x is an integer ranging from 2 to 8; and the symbols y and z are identical or different, whole or fractional numbers, the sum of which ranges from 0 to 100; with (b) at least one N,N'-bismalimide having the formula:

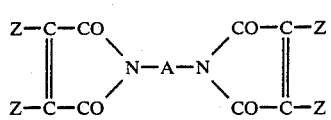

in which:

the symbols Z, which are identical or different, are each H, $CH_3$, or Cl;

the symbol A is cyclohexylene, phenylene, 4-methyl-1,3-phenylene, 2-methyl-1,3-phenylene, 5-methyl-1,3-phenylene, 2,5-diethyl-3-methyl-1,4-phenylene, or a radical of the formula:

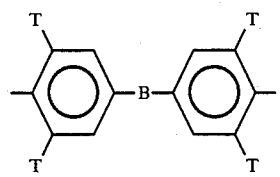

in which B is a single valence bond or one of the groups or atoms;

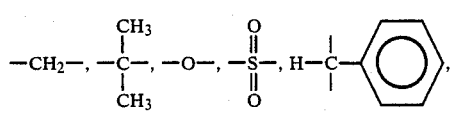

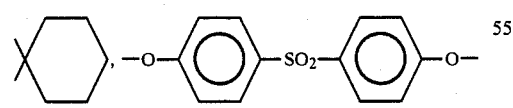

and the symbols T, which are identical or different, are each a hydrogen atom or a methyl, ethyl or isopropyl radical; and (c) optionally, at least one olefinically unsaturated comonomer copolymerizable with said bismaleimides of formulae (I) and (II).

2. The imido polymer as defined by claim 1, wherein (c) is:

($C_1$) at least one comonomer of the formula:

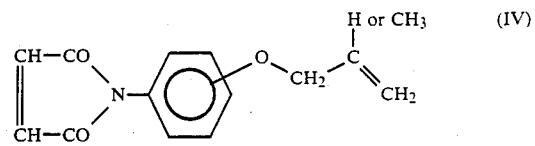

in which the allyloxy or methallyloxy radical is in an ortho, metal or para position relative to the nitrogen-bonded carbon atom of the benzene ring.

3. The imido polymer as defined by claim 1, wherein (c) is:

($C_2$) an admixture of at least one comonomer of the formula:

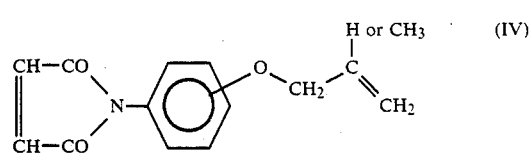

in which the allyloxy or methallyloxy radical is in an ortho, metal or para position relative to the nitrogen-bonded carbon atom of the benzene ring; with at least one monosubstituted comonomer of the formula:

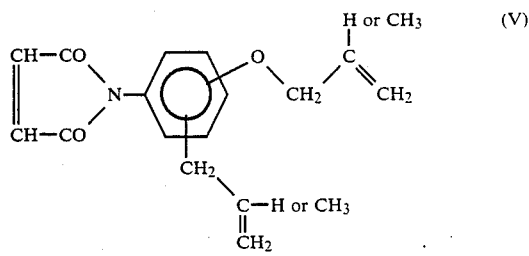

4. The imido polymer as defined by claim 3, said admixture ($C_2$) further comprising at least one disubstituted comonomer of the formula:

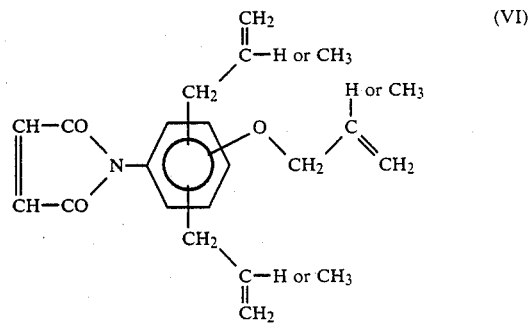

or, ($C_3$), at least one olefinically unsaturated, substituted heterocycle.

5. The imido polymer as defined by claim 1, wherein the bismaleimide of formula (I) is present in an amount of from 2 to 50% by weight; and the bismaleimide(s) of formula (II) is present in an amount of from 50 to 98% by weight.

6. The imido polymer as defined by claim 1, wherein reactant (c) is present in an amount up to 60% by weight, based upon the total weight of the reactants (a)+(b).

7. A cured imido polymer, said cured polymer being prepared from the polymer defined by claim 1, and being solvent insoluble, and exhibiting no appreciable softening below its degradation temperature.

8. The imido polymer as defined by claim 1, comprising a heat-curable prepolymer soluble in polar organic solvents and exhibiting a softening point at a temperature below 200° C.

9. A shaped article comprising the imido polymer as defined by claim 1.

10. A shaped article comprising the imido polymer as defined by claim 7.

11. A shaped article comprising the imido polymer as defined by claim 8.

12. The imido polymer defined by claim 1, said polymer being prepared in the presence of (d) a catalyst.

13. The imido polymer as defined by claim 12, wherein (d) is selected from:

(d$_1$) a radical polymerization initiator, or (d$_2$) an imidazole compound of the formula:

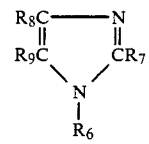
(VII)

in which R$_6$, R$_7$, R$_8$ and R$_9$, which are identical or different, are each a hydrogen atom, an alkyl or alkoxy radical containing from 1 to 20 carbon atoms, or a vinyl, phenyl or nitro radical, with the proviso that R$_8$ and R$_9$ may together form, with the carbon atoms from which they depend, a single ring member, and with the further proviso that R$_6$ can be a carbonyl group linked to a second imidazole ring.

14. The imido polymer as defined by claim 12 wherein said catalyst (d) is present in an amount of from 0.01 to 1% by weight, relative to the total weight of the reactants (a)+(b)+optionally, (c).

* * * * *